United States Patent
Ibaraki et al.

(12)

(10) Patent No.: US 7,074,282 B2
(45) Date of Patent: Jul. 11, 2006

(54) STEEL WIRE ROD FOR HARD DRAWN SPRING, DRAWN WIRE ROD FOR HARD DRAWN SPRING AND HARD DRAWN SPRING, AND METHOD FOR PRODUCING HARD DRAWN SPRING

(75) Inventors: Nobuhiko Ibaraki, Kobe (JP); Atushi Inada, Kobe (JP); Sumie Suda, Kobe (JP); Noritoshi Takamura, Sagamihara (JP); Satoru Tendoh, Ina (JP); Tadayoshi Fujiwara, Mino (JP); Tetsuo Jinbo, Hirakata (JP)

(73) Assignees: Kabushiki Kaisha Kobe Seiko Sho, Kobe (JP); NHK Spring Co., Ltd., Yokohama (JP); Shinko Wire Co., Ltd., Amagasaki (JP)

( * ) Notice: Subject to any disclaimer, the term of this patent is extended or adjusted under 35 U.S.C. 154(b) by 368 days.

(21) Appl. No.: 10/204,406
(22) PCT Filed: Dec. 19, 2001
(86) PCT No.: PCT/JP01/11120
§ 371 (c)(1), (2), (4) Date: Aug. 27, 2002
(87) PCT Pub. No.: WO02/50328
PCT Pub. Date: Jun. 27, 2002

(65) Prior Publication Data
US 2003/0024610 A1 Feb. 6, 2003

(30) Foreign Application Priority Data
Dec. 20, 2000 (JP) .......................... 2000-387639
Dec. 20, 2000 (JP) .......................... 2000-387640

(51) Int. Cl.
C22C 38/00 (2006.01)

(52) U.S. Cl. ................... 148/333; 148/336; 148/230; 148/318; 148/580
(58) Field of Classification Search ............... 148/230, 148/333, 336, 318, 580, 908
See application file for complete search history.

(56) References Cited

U.S. PATENT DOCUMENTS

| 4,123,296 A | * | 10/1978 | Yamakoshi et al. | 148/333 |
| 4,889,567 A | * | 12/1989 | Fujiwara et al. | 148/598 |
| 5,118,469 A | * | 6/1992 | Abe et al. | 420/109 |
| 5,211,772 A | | 5/1993 | Ashida et al. | |
| 5,286,312 A | | 2/1994 | Shimotsusa et al. | |
| 5,458,699 A | * | 10/1995 | Tsukamoto et al. | 148/320 |
| 5,508,002 A | | 4/1996 | Kawaguchi et al. | |
| 5,575,866 A | | 11/1996 | Minamida et al. | |
| 5,665,179 A | * | 9/1997 | Izawa et al. | 148/226 |
| 5,776,267 A | | 7/1998 | Nanba et al. | |
| 5,873,958 A | | 2/1999 | Makii et al. | |
| 6,017,641 A | * | 1/2000 | Aoki et al. | 428/544 |
| 6,206,984 B1 | | 3/2001 | Inada et al. | |
| 6,322,641 B1 | | 11/2001 | Makii et al. | |
| 6,372,056 B1 | | 4/2002 | Kuroda et al. | |

FOREIGN PATENT DOCUMENTS

| JP | 61-136612 | 6/1986 |
| JP | 6-158226 | 6/1994 |
| JP | 8-120407 | 5/1996 |
| JP | 11-199981 | 7/1999 |

* cited by examiner

*Primary Examiner*—Ngoclan T. Mai
(74) *Attorney, Agent, or Firm*—Oblon, Spivak, McClelland, Maier & Neustadt, P.C.

(57) ABSTRACT

Disclosed is a steel wire rod for hard-drawn springs capable of exhibiting fatigue strength and sag resistance equivalent to or higher than springs made of an oil-tempered wire. The steel wire rod contains carbon in a range from 0.5 to less than 0.7 mass %, silicon in a range from 1.4 to 2.5 mass %, manganese in a range from 0.5 to 1.5 mass %, chromium in a range from 0.05 to 2.0 mass %, and vanadium in a range from 0.05 to 0.40 mass %, and has an area ratio Rp with respect to pearlite which satisfies the mathematical expression (1):

$$Rp(\text{area \%}) \geq 55 \times [C] + 61 \quad (1)$$

where [C] denotes the content (mass %) of carbon.

16 Claims, 1 Drawing Sheet

STEEL WIRE ROD FOR HARD DRAWN SPRING, DRAWN WIRE ROD FOR HARD DRAWN SPRING AND HARD DRAWN SPRING, AND METHOD FOR PRODUCING HARD DRAWN SPRING

TECHNICAL FIELD

This invention relates to a steel wire rod for hard-drawn springs which is useful as a material for valve springs, clutch springs, brake springs, etc. of automotive engines, a wire for hard-drawn springs using such a wire rod, hard-drawn springs, and a useful method for producing such hard-drawn springs.

BACKGROUND ART

As development of light-weighted construction and high performance for automotive vehicles, etc. has progressed, high stress design has been required for valve springs, clutch springs, brake springs or the like. Springs excellent in fatigue strength and sag resistance have been demanded. In particular, there is a strong demand for high stress design of valve springs.

Recently, it has been a custom that valve springs are primarily produced by cold coiling an oil-tempered wire that has been applied with quenching and tempering. According to the Japanese Industry Standards (JIS), for example, an oil-tempered wire (according to JIS G3561) for valve springs is separately defined from an ordinary oil-tempered wire (according to JIS G3560). Thus, it is required to strictly control the kind of steel, allowable impurity content, depth of flaw, etc.

The oil-tempered wire has the following advantage and disadvantage. As regards the advantage, since the oil-tempered wire has tempered martensite, it can provide springs of high strength, and it has excellent fatigue strength and sag resistance. As regards the disadvantage, there is required a large-scaled facility and cost for heat treatment such as quenching and tempering to produce the oil-tempered wire.

Some of valve springs of low load stress are obtained by drawing carbon steel that has ferrite/pearlite or pearlite to increase strength (also called "hard-drawn wire"), and by cold coiling the hard-drawn wire. According to the JIS, such a wire belongs to the criteria of "Piano Wire Type V" for "valve springs or like springs" in the criteria of piano wires according to JIS G3522.

Springs made of the aforementioned hard-drawn wire (hereinafter, referred to as "hard-drawn springs") can be produced with a low cost because heat treatment is not required in the production method. However, the wire in which ferrite/pearlite or pearlite has been subjected to drawing has low fatigue properties and low sag resistance. Accordingly, even if such a wire is used for springs, it cannot provide for high-strength springs that are required in the recent technology.

There also have been studied various techniques to produce high-strength hard-drawn springs in light of the advantage of low-cost production. Japanese Unexamined Patent Publication No. HEI 11-199981 proposes an exemplified method for obtaining cementite of a specific configuration by performing a wire drawing process to pearlite in eutectoid-hypereutectoid steel, which is usable as a piano wire having properties equivalent to an austempered wire. This method, however, unavoidably raises the production cost because the production process is complicated such that a step of changing the wire drawing direction is additionally required.

In view of the above, an object of this invention is to provide a steel wire rod used for producing hard-drawn springs capable of exhibiting fatigue strength and sag resistance equivalent to or higher than springs produced by an oil-tempered wire, a wire for hard-drawn springs, such hard-drawn springs, and a useful method for producing such hard-drawn springs with a low cost.

DISCLOSURE OF THE INVENTION

An inventive steel wire rod for hard-drawn springs that has accomplished the above object contains carbon in a range from 0.5 to less than 0.7 mass %, silicon in a range from 1.4 to 2.5 mass %, manganese in a range from 0.5 to 1.5 mass %, chromium in a range from 0.05 to 2.0 mass %, and vanadium in a range from 0.05 to 0.40 mass %, and has an area ratio Rp with respect to pearlite which satisfies the mathematical expression (1):

$$Rp(\text{area }\%) \geqq 55 \times [C] + 61 \qquad (1)$$

where [C] denotes the content (mass %) of carbon.

It is effective for the inventive steel wire rod (a) to contain nickel in a range from 0.05 to 0.5 mass % or (b) to satisfy the requirement that the number of carbide and carbo-nitride of vanadium and chromium, complex carbide and complex carbo-nitride of vanadium and chromium each having a diameter of 50 nm or less in terms of a hypothetical circle, is not smaller than ten per unit area of $\mu m^2$ in lamellar ferrite. With this arrangement, the properties of the hard-drawn springs can be further improved.

An inventive wire for hard-drawn springs that has accomplished the above object contains carbon in a range from 0.5 to less than 0.7 mass %, silicon in a range from 1.4 to 2.5 mass %, manganese in a range from 0.5 to 1.5 mass %, chromium in a range from 0.05 to 2.0 mass %, and vanadium in a range from 0.05 to 0.40 mass %, and has an area ratio Rp with respect to pearlite which satisfies the mathematical expression (1), and has a tensile strength TS which satisfies the mathematical expression (2):

$$Rp(\text{area }\%) \geqq 55 \times [C] + 61 \qquad (1)$$

where [C] denotes the content (mass %) of carbon, $$-13.1d^3 + 160d^2 - 671d + 3200 \geqq TS \geqq -13.1d^3 + 160d^2 - 671d + 2800 \qquad (2)$$

where d is a diameter (mm) of the wire which satisfies the expression [$1.0 \leqq d \leqq 10.0$].

It is effective for the wire to contain nickel in a range from 0.05 to 0.5 mass %.

High-strength hard-drawn springs are producible by using the above steel wire rod or the above wire. Further, preferably, the hard-drawn springs satisfy the requirement that a residual stress of the spring is changed from a compression to a tension at a depth of 0.05 mm or more from the inner surface of the spring. More preferably, the depth-wise position of the spring is 0.15 mm or more from the inner surface of the spring. Furthermore, it is effective to apply a nitriding process on the hard-drawn springs.

In producing the aforementioned hard-drawn springs, it is desirable to apply a stress τ (MPa) to the springs at a temperature not lower than a room temperature at least once after shot-peening, wherein the stress τ satisfies the mathematical expression (3):

$$\tau \geqq TS(MPa) \times 0.5 \qquad (3)$$

where TS denotes a tensile strength of the wire. In this production method, preferably, the temperature at which the stress τ is applied is 120° C. or higher.

BEST MODE FOR CARRYING OUT THE INVENTION

Figure 1:
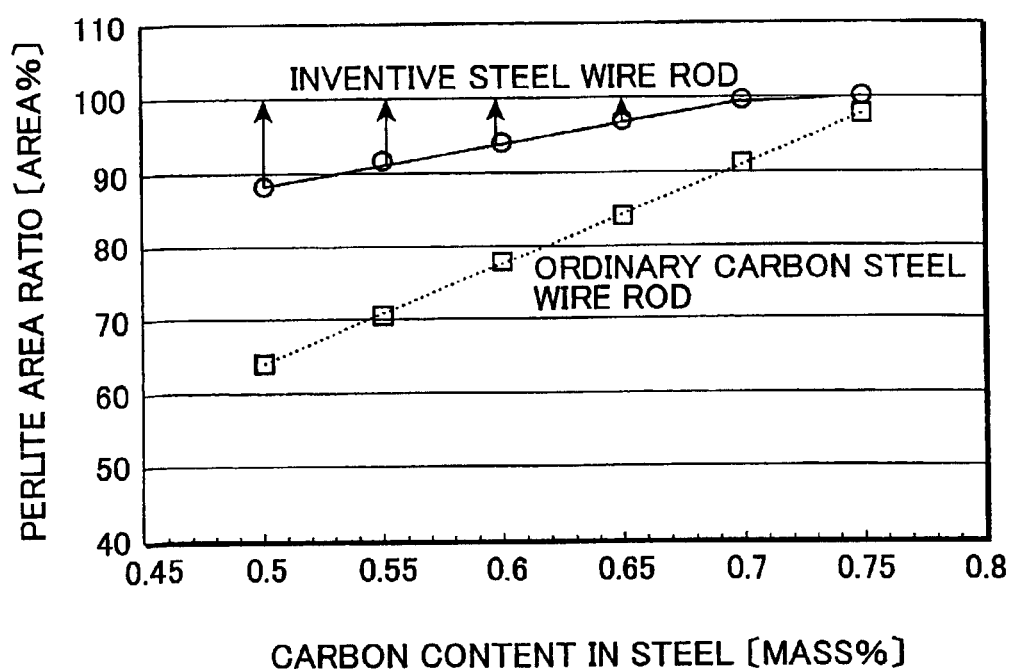
FIG. 1 is a graph showing a relationship between carbon content and area ratio of pearlite in comparison of the inventive steel wire rod with ordinary carbon steel wire rod.

The inventors of this application have made extensive study and researches in order to find out a steel material for hard-drawn springs that can accomplish the above object of this invention from a variety of angles. As a result of their study, they have found that a steel wire rod whose chemical composition has been strictly defined and which satisfies the range [range as defined in the aforementioned mathematical expression (1)] in terms of a relationship between the area ratio of pearlite and the carbon content in the steel wire rod can produce hard-drawn springs which exhibit fatigue strength and sag resistance equivalent to or higher than springs using an oil-tempered wire, and accomplished this invention.

The chemical composition of the inventive steel wire rod is required to be properly regulated in the following manner. The reasons for setting the range of each component are as follows.

C: 0.5 to Less than 0.7 Mass %

Carbon is a useful element to enhance tensile strength of a wire and to secure certain fatigue properties and sag resistance of springs. An ordinary piano wire contains carbon of about 0.8 mass %. However, in producing a wire of high strength, which is an object of this invention, if the content of carbon is 0.7 mass % or larger, a wire containing carbon in such a high content has increased defect sensitivity, and a crack occurs from surface flaws and inclusion. As a result, fatigue life of springs made of such a wire may be shortened. In view of this, in this invention, the content of carbon is set to be less than 0.7 mass %. On the other hand, if the content of carbon is less than 0.5 mass %, a wire containing carbon in such a low content cannot provide a tensile strength as required for producing high-strength springs. To make matters worse, in case of such a low carsbon content, the content of pro-eutectoid ferrite, which promotes generation of cracks due to fatigue, may increase, thereby deteriorating fatigue properties of springs. In view of this, it is necessary to set the lower limit of carbon content at 0.5 mass %.

Si: 1.4 to 2.5 Mass %

Silicon is an element which enhances a tensile strength of a wire by a solid solution strengthening and which contributes to improvement in fatigue properties and sag resistance of springs. It is necessary to increase the content of silicon by an amount corresponding to the lowered content of carbon. In view of this, the lower limit of silicon content is set at 1.4 mass %. On the other hand, if the silicon content exceeds 2.5 mass %, deoxidation, flaws or the like may increase on the spring surface, which may lower the fatigue strength of springs. Preferably, the lower limit of the silicon content is set at about 1.7 mass %, and the upper limit thereof is set at about 2.2 mass %.

Mn: 0.5 to 1.5 Mass %

Manganese is an element which makes pearlite in fine and orderly manner and which contributes to improvement in fatigue properties of springs. In order to allow springs to exhibit such effects, it is required to set the content of manganese at 0.5 mass % or more. However, an excessive content of manganese may likely to generate bainite at the time of hot rolling or patenting, which resultantly may deteriorate fatigue properties of springs. In view of this, the manganese content is required to be set at 1.5 mass % or lower. Preferably, the lower limit of the manganese content is set at about 0.7 mass %, and the upper limit thereof is set at about 1.0 mass %.

Cr: 0.05 to 2.0 Mass %

Chromium is an element which is useful in narrowing pearlite lamellar spacing, increasing strength after hot rolling or heat treatment, and in improving sag resistance of springs. In order to allow springs to exhibit the above effects, it is required to set the content of chromium at 0.05 mass % or more. An excessive content of chromium, however, may undesirably extend the period for patenting, and deteriorate toughness and ductility of springs. In view of this, it is required to set the chromium content at 2.0 mass % or less.

V: 0.05 to 0.40 Mass %

Vanadium is an element which is useful to fine the nodule size of pearlite and in improving wire drawability, toughness and sag resistance of springs, etc. In order to allow springs to exhibit the above effects, it is required to set the vanadium content at 0.05 mass % or more. Preferably, the vanadium content is set at 0.10 mass % or more. Excessive content of vanadium, namely, vanadium content of more than 0.40 mass % may likely to produce bainite at the time of hot rolling or patenting, which may resultantly shorten fatigue life of the springs.

The basic chemical composition of the inventive steel wire rod is as mentioned above. It is possible to add nickel in the range from 0.05 to 0.5 mass % according to needs. The range of nickel content and the reason for setting the range thereof are as follows.

Ni: 0.05 to 0.5 Mass %

Nickel is an element which is effective in lowering defect sensitivity, increasing toughness of springs, suppressing breakage trouble at the time of coiling, and in improving fatigue life of springs. In order to allow nickel to exhibit the above effects, it is preferable to contain nickel of 0.05 mass % or more. Excessive content of nickel, however, may likely to produce bainite at the time of hot rolling or patenting, which resultantly may produce disadvantages rather than the above advantages. In view of this, the nickel content is preferably set at 0.5 mass % or lower. Preferably, the lower limit of nickel content is set at 0.15 mass %, and the upper limit thereof is set at 0.30 mass %.

The essential component of the remainder constituting the inventive steel wire rod other than the aforementioned chemical components is iron. However, it should be appreciated that minor components other than the above components may be contained as far as they do not interfere the properties of the steel material for producing the inventive springs. In other words, a steel wire rod containing such minor components falls in the scope of this invention. Some of the exemplified minor components are molybdenum in the content of about 0.5 mass % or less, which is added for the purpose of obtaining improved effect due to hardenability, aluminum in the content of about 0.05 mass % or less, which is added as a deoxidizer at the time of producing steel, and impurities, particularly, unavoidable impurities such as phosphorous, sulfur, arsenic, antimony, tin, etc. (e.g., 0.02% or less with respect to phosphorous or sulfur, and 0.01% or less with respect to arsenic, antimony, and tin).

It is required to set the composition of the inventive steel wire rod in an appropriate range [range as defined in the aforementioned mathematical expression (1)] in light of a relationship between the area ratio of pearlite and the carbon content in a steel wire rod. The reason for setting the range is as follows.

The carbon content of the steel used in this invention is required to be set not lower than 0.5 mass % to less than 0.7 mass % as mentioned above, namely, lower than the content of eutectoid component. When a wire rod is produced by using a steel having such a composition according to a conventional method, pro-eutectoid ferrite is likely to generate on the wire rod, and fatigue failure may occur from such pro-eutectoid ferrite, thus shortening fatigue life of resultant springs. In order to eliminate such a drawback, it is required to suppress generation of pro-eutectoid ferrite as much as possible while increasing the ratio of pearlite.

FIG. 1 is a graph showing a relationship between the carbon content and the area ratio of pearlite in a steel material. Whereas generally available carbon steel has a relatively low pearlite area ratio, the inventive steel wire rod has a relatively high pearlite area ratio considering its relation to the carbon content in view of the above point.

It is effective to maximize the cooling rate of the wire rod in a temperature zone at least covering a transformation point $A_{e3}$ (uppermost temperature at which austenite and ferrite can coexist in an equilibrium state) and a transformation point $A_{e1}$ (uppermost temperature at which ferrite and cementite can coexist) at the time of hot rolling or patenting in order to obtain such a structure that satisfies the aforementioned mathematical expression (1). Specifically, in case of hot rolling, it is effective to control the cooling rate at 5° C./sec or higher, preferably at 10° C./sec or higher in the above temperature zone as a cooling condition on a conveyor. It should be noted, however, that excessively continuing the cooling may fail to obtain fine pearlite, with the result that a structure such as bainite as a result of super cooling may be intruded, thereby lowering toughness of the resultant springs. In view of the above, it is recommended to monitor the cooling condition each time the wire rod is carried over the conveyor at certain positions in such a manner that the cooling is gradually carried out until the temperature of the wire rod falls below about 550° C.

In case of patenting, the cooling rate from the transformation point $A_{e3}$ to the transformation point $A_{e1}$ is relatively fast. However, it is preferable to select a medium having large heat conductivity for performing isothermal transformation of the wire rod. Specifically, it is preferable to use a lead bath or a salt bath rather than a fluid bath. It is preferable to provide a cooling step between a step of austenitizing in a heating furnace and a step of performing isothermal transformation in a furnace to thereby forcibly perform cooling by the cooling step in order to expedite cooling operation. It is also effective to maximize the wire speed in order to accelerate the cooling rate. It is also possible to measure the pearlite area ratio Rp with respect to a wire or with respect to springs as a final product because the pearlite area ratio Rp does not greatly vary depending on a status as to whether a wire drawing process or a spring forming process which follows the wire drawing process has been implemented or not.

It is desirable to reinforce a ferrite part of a steel wire rod, which is the weakest part of pearlite since such reinforcement can improve sag resistance of resultant springs. To reinforce ferrite means to precipitate micro precipitants in the ferrite to such an extent that the sum of the number of precipitants, namely, carbide and carbonitride of vanadium and chromium, complex carbide and complex carbonitride of vanadium and chromium (hereinafter, all these kinds of precipitants are sometimes referred to as "complex carbonitride, etc.") in which each precipitant has a diameter of 50 nm or less in terms of a hypothetical circle, is ten or more per $\mu m^2$. The term "diameter in terms of a hypothetical circle" means a diameter of a hypothetical circle whose area is equivalent to the actual area of a corresponding precipitant.

As far as the inventive steel wire rod satisfies the above requirements, it is allowable for the inventive steel wire rod to partially contain complex carbide, etc. having a diameter larger than 50 nm in terms of a hypothetical circle. However, it is preferable that almost or all the complex carbide etc. has a diameter of 50 nm or smaller. The lower limit of the size of such complex carbides is not specifically limited. However, considering the fact that the maximal size of a substance recognizable by, e.g., a currently available transmission microscope of magnification at 150,000 is about 10 nm, it is true to say that about 10 nm is substantially a lower limit of a measurable precipitant according to a accurate state of art.

It is preferable (1) to cool the wire rod at a cooling rate of 2° C./sec or more in a a temperature zone from 900 to 800° C., which is an austenitizing temperature zone, (namely, not to precipitate in the austenitizing temperature zone) after rolling and then cool the wire rod at a cooling rate from 0.5 to 1.0° C./sec in a temperature of 750 to 400° C. or (2) to transform the wire rod at 640° C./sec after heating the wire rod to 900° C., and then cool the wire rod at a cooling rate of 0.5 to 1.0° C./sec until the temperature of the wire rod reaches 400° C. in order to satisfy the above requirements while securely dispersing a large amount of micro precipitants in the ferrite.

Drawing the steel wire rod having been treated as mentioned above into a wire and coiling the wire enables to produce springs capable of exhibiting the desirable properties. It is effective to allow the wire obtained by drawing the steel wire rod (hard-drawn wire for springs) to satisfy the above mathematical expression (2) to allow the resultant springs to exhibit the above effects more efficiently.

In association with the expression (2), the tensile strength of a wire is defined in accordance with the diameter of a wire in the criteria of JIS G3522-SWP-V. Specifically, tensile strength TS defined in the afoementioned criteria is lower than that in the criteria of SWP-B, etc. designed for springs of general use. The reason for setting the tensile strength of the wire according to the above standard lower than that for springs of general use is conceived as follows. Excessively high tensile strength may likely to increase defect sensitivity of wire, lower toughness and ductility of springs, and cause undesirable breaking of wire while drawing, breakage during coiling, fatigue failure, brittle fracture of springs, etc.

In view of the above, this invention has succeeded in producing springs from the wire having the tensile strength TS equal to or larger than the value in the right object of the expression (2), as well as use of such springs by lowering defect sensitivity and increasing toughness and ductility. However, setting the tensile strength TS of the wire excessively high may cause an adverse effect due to increased defect sensitivity or lowered toughness and ductility. In view of such a drawback, according to this invention, the value in the left object of the expression (2) is set as the upper limit of the tensile strength. Although a wire which satisfies the requirements in the expression (2) may be obtainable with use of a conventional wire drawing facility. However, considering a recent demand that a wire of an extremely high strength is subjected to plastic deformation, it is desirable to optimally set the requirements so as not to cause breaking of wire. In view of this, the following matters should be considered: (1) a metallic soap is used as a lubricant after coating the wire rod with phosphate as a pre-drawing process; (2) the reduction of area of each die used for wire drawing is set in a range from 15 to 25% (the reduction of area of a die used in a final stage of wire drawing can be set lower than the aforementioned range in order to regulate a residual stress), and (3) a wire drawing rate should not be exceedingly raised in order to prevent temperature rise during the drawing, etc.

In the inventive springs, it is preferable that a residual stress is changed from a compression to a tension at a depth of 0.05 mm or more from the inner surface of the spring, and preferably at a depth of 0.15 mm or more. Generally, valve springs and high-strength springs equivalent thereto are used in a state where a compressive residual stress is exerted onto the spring surface by shot-peening. When such a residual stress is measured stepwise in a depth direction of the spring from the inner surface thereof, the measured residual stress turns from a compression to a tension at a certain depth-wise position (hereinafter, this point is referred to as "crossing point"). The crossing point depends on the condition of shot-peening, the hardness of the steel material, the residual stress distribution of the base material of the springs before shot-peening, etc. A tension residual stress due to wire drawing is exerted to the inner surface of a hard-drawn wire produced according to a conventional method. Accordingly, the depth-wise position of the hard-drawn springs after shot-peening is likely to be shortened compared to a case of springs made of an oil-tempered wire. On the other hand, it is desirable to apply a strong force at shot-peening to the inventive hard-drawn springs than springs made of an oil-tempered wire in such a manner that the depth-wise position of the spring, namely, the crossing point is set as deep as at 0.05 mm or more, and preferably at 0.15 mm or more considering that hard-drawn springs made of the inventive wire are required to be used under a higher stress than hard-drawn springs of general use.

In order to set the depth-wise position of the spring, namely, the crossing point at the aforementioned level, it is effective (a) to set the reduction of area of a die used in a final stage of drawing at 10% or less, preferably in the range from about 3 to about 6%, (b) to set a stress relieving annealing temperature after coiling at 360° C. or higher, (c) to perform shot-peening at least once with use of a shot having an average diameter of 0.3 mm or larger, preferably 0.6 mm or larger for the purpose of reducing a tension residual stress during a wire drawing process.

In the case where it is expected that the inventive springs be used under a particularly severe and stressful condition, it is effective to apply a nitriding process to the spring surface. Applying a nitriding process makes it possible to further improve fatigue strength of the springs. Such a nitriding process has been conventionally applied to valve springs made of an oil-tempered wire. However, there has not been applied a nitriding process to conventional hard-drawn springs. This is because heretofore hard-drawn springs have not been used under such a severe and stressful condition as required in the recent technology, and it has been conceived that a desirable effect cannot be obtained from the conventional hard-drawn wires having a conventional chemical composition even if nitriding process is applied on resultant springs.

Applying a hard drawing process to a wire rod having the chemical composition as defined in this invention and applying a nitriding process to the hard-drawn springs enables to improve fatigue life of the springs. The reason why the hard-drawn springs having been applied with a nitriding process exhibits the above effects is conceived as follows. Specifically, since the inventive springs have low carbon content, the volume of ferrite phase to cementite phase constituting pearlite is increased. Furthermore, the strength of the inventive wire depends on the strength of ferrite itself because ferrite has been strengthened by alloy elements such as silicon, vanadium, and chromium. Accordingly, it is conceived that increasing the strength of ferrite by nitriding leads to direct improvement of fatigue strength of the springs. The inventors of this application verified that the effect resulting from performing a nitriding process is most remarkably obtainable when the nitriding process is performed in such a manner that the depth-wise position at 10 μm from the surface of the spring has a hardness of HV600 or more (preferably HV700 or more).

It is effective to apply a stress τ to springs at least once at a room temperature or higher, preferably at 120° C. or higher after shot-peening, wherein the stress τ satisfies the above mathematical expression (3) when forming the inventive wire rod or the inventive wire into the springs. Generally, hard-drawn springs have a low sag resistance compared to springs made of an oil-tempered wire. This invention has been made for the purpose of improving sag resistance of the hard-drawn springs by setting the chemical compositions of the steel in the respective predetermined ranges and by increasing the tensile strength of the wire. However, there is a case that a further improved sag resistance is required depending on the purpose and condition of use of the hard-drawn springs. To cope with such a demand, it is effective to apply the stress τ to springs at least once at a room temperature or more (preferably, 120° C. or more). It is conceived that applying the stress as mentioned above enables to stabilize dislocation accompanied by wire drawing and to enhance resistance of the wire against plastic deformation. It should be noted that the tensile strength TS of the hard-drawn wire in the expression (3) is a value measured with respect to the wire.

EXAMPLES

Hereinafter, this invention is described in more details with reference to the examples. It should be appreciated that this invention is not limited to the examples, and as far as not departing from the gist of this invention, any modification and alteration is embraced in the technical scope of this invention.

Steel materials (A to I) having the chemical compositions respectively as shown in Table 1 were melted, poured into a mold, and subjected to hot rolling, and steel wire rods each having a diameter of 9.0 mm were produced. At this stage, the size of the compounds precipitated in the ferrite among the pearlite of each wire rod was measured. The size of the compounds was measured by photographing the compounds precipitated on the wire rod by thin-film replica method with a transmission electron microscope (TEM) at an accelerated voltage of 200 KV and magnification of 150,000. Among the precipitating compounds, counted was the number of micro precipitants each having a diameter of 50 nm or less in terms of a hypothetical circle which have been precipitated in the ferrite of 1 μm² [(150 mm²) at the magnification of 150,000]. The site for the measurement was set at the depth-wise 0.2 mm-position from the surface of the wire rod in view of the facts that (a) the surface part of a spring is a part where the spring is exerted with a maximal stress and that (b) the surface of a roll steel is sliced off by SV process after rolling. Further, the number of complex carbonitrides, etc. was counted through visual recognition by the TEM. The visually non-recognizable micro complex carbonitrides, etc. have been identified as such complex carbonitrides, etc. by means of an X-ray diffraction pattern. The number of complex carbonitirdes, etc. of a size in a range from 10 to 50 nm was counted by the TEM at a magnification of 150,000. Furthermore, the measurement was performed with respect to each steel wire rod through arbitrary three different fields of view, and the average of the measurement results was obtained (see Table 2).

After the hot rolling, softening was performed with respect to all the steel wire rods except the steel wire rod made of the steel material F. Then, shaving, patenting, and wire drawing were performed with respect to all the steel wire rods. Thus, wires each having the diameter as shown in Table 2 were produced. Patenting was performed by setting an austenitizing heating temperature at 940° C. and by setting the drawing rate at a relatively high level of 8.0 m/min. Further, with respect to Examples No. 1 to 10, 12, and 15, the wire rods were subjected to rapid cooling by forcibly blowing pressurized air onto the wire rodes before being carried into a lead furnace at a temperature of 620° C. in order to increase the area ratio of pearlite. All the wire rods of the Examples Nos. 1 to 9, 11, and 12 except the wire rod of Example No. 10 were furnace, and then cooled at a cooling rate ranging from 0.5 to 1° C./sec until the temperature of the wire rods has lowered to 400° C. The wire rod of Example No. 10 was cooled at a cooling rate of 3° C./sec until the wire rod was cooled to 400° C. after brought into an isothermal treatment in the lead furnace.

The wire drawing was carried out by a continuous wire drawing machine equipped with 8 pieces of dies in which the reduction of area of each die except the die used in a final stage of wire drawing was set in the range from 15 to 25%, and the reduction of area of the die of the final use was set at 5%, and the wire drawing rate at the die of the final use was set at 200 m/min. Furthermore, cooling wire drawing was carried out in which the wire rod was directly water-cooled while drawing in order to prevent temperature rise of the wire rod accompanied by wire drawing.

The thus obtained wires produced by wire drawing were formed into springs at a room temperature, and subjected to stress relieving (400° C.×20 min.), seat position grinding dual shot-peening, low-temperature annealing (230° C.×20 min.), and presetting (application with a stress) ($\tau_{max}$ corresponding to 1200 MPa). Presetting was performed at about 180° C. with respect to the springs of Examples Nos. 4 through 9 by utilizing redundant heat generated from the low-temperature annealing. Nitriding process was applied to the springs of Examples Nos. 5 and 6 at 460° C. for 5 consecutive hours. The pearlite area ratio of the springs was analyzed and evaluated by taking photographs of cross sections of the wires after patenting by an optical microscope (400 magnifications, 10 fields) and by analyzing the photos according to a computerized image analyzer.

TABLE 1

| Ex. No. | Kind of Steel | Chemical Composition (mass %) | | | | | | 55 × [C] + 61 | Rp[%] |
|---|---|---|---|---|---|---|---|---|---|
| | | C | Si | Mn | Ni | Cr | V | | |
| 1 | A | 0.59 | 1.95 | 0.88 | 0.23 | 0.90 | 0.11 | 93.5 | 96.5 |
| 2 | A | 0.59 | 1.95 | 0.88 | 0.23 | 0.90 | 0.11 | 93.5 | 96.5 |
| 3 | A | 0.59 | 1.95 | 0.88 | 0.23 | 0.90 | 0.11 | 93.5 | 96.5 |
| 4 | A | 0.59 | 1.95 | 0.88 | 0.23 | 0.90 | 0.11 | 93.5 | 96.5 |
| 5 | A | 0.59 | 1.95 | 0.88 | 0.23 | 0.90 | 0.11 | 93.5 | 96.5 |
| 6 | A | 0.59 | 1.95 | 0.88 | 0.23 | 0.90 | 0.11 | 93.5 | 96.5 |
| 7 | B | 0.51 | 1.80 | 0.75 | 0.08 | 1.09 | 0.17 | 89.1 | 97.7 |
| 8 | C | 0.65 | 1.91 | 0.90 | 0.19 | 0.64 | 0.09 | 96.8 | 98.7 |
| 9 | D | 0.68 | 1.45 | 0.75 | 0 | 0.40 | 0.25 | 98.4 | 99.0 |
| 10 | E | 0.55 | 1.89 | 0.81 | 0.20 | 0.15 | 0.08 | 91.3 | 98.7 |
| 11 | J | 0.60 | 1.97 | 0.79 | 0.20 | 1.75 | 0.12 | 94.0 | 97.1 |
| 12 | K | 0.62 | 1.85 | 0.71 | 0.15 | 0.70 | 0.34 | 95.1 | 99.0 |
| 13 | A | 0.59 | 1.95 | 0.88 | 0.23 | 0.90 | 0.11 | 93.5 | 88.6 |
| 14 | F | 0.92 | 0.25 | 0.75 | 0 | 0 | 0 | — | 100.0 |
| 15 | G | 0.80 | 1.90 | 0.85 | 0.18 | 0.85 | 0.15 | — | 100.0 |
| 16 | H | 0.80 | 1.26 | 0.92 | 0.32 | 0.87 | 0.20 | — | 100.0 |
| 17 | I | 0.62 | 0.96 | 0.79 | 0.21 | 0.96 | 0.13 | 95.1 | 97.9 |

Fatigue test was performed with respect to the thus obtained springs under a load stress of 637±588 MPa, and the breaking life was measured life was measured with respect to springs under a stress of 882 MPa at 120° C. for 48 consecutive hours, and the thus measured residual shear strain was set as an index for sag resistance (namely, the smaller the residual shear strain was, the better the sag resistance was).

The results of measurements are shown in Table 2 along with the respective conditions for manufacturing the springs, tensile strength TS of wire, values in the right object and left object in the expression (2), crossing point, hardness at 10 μm depth-wise position from the spring surface, and the number of precipitants.

The hardness at the 10 μm depth-wise position from the spring surface was measured by a so-called "Code method" in which a test piece was embedded in a resin at a known inclination angle, the Vickers hardness (load of 300 g) was measured with respect to the test piece whose surface was polished, and the thus obtained Vickers hardness was converted into a corresponding value in a vertical direction. The residual stress was measured according to an X-ray diffraction method. The profiles of residual stress with respect to each spring in the depth-wise direction were evaluated by removing the surface layers of the springs stepwise by chemical polishing and by performing X-ray diffraction measurement.

TABLE 2

| No. | Wire diameter (mm) | TS of wire (Mpa) | Left Object in (2) | Right Object in (2) | Distance to Crossing point (mm) | Stress at 120° C. or higher | Nitriding | Hardness at 10 μm⁻ position (HV) | Number of Precipitants of 50 nm or less in dia. (per μm²) | Residual Shear strain (×10⁻⁴) | Fatigue Life (×10⁶) |
|---|---|---|---|---|---|---|---|---|---|---|---|
| 1 | 4.4 | 1800 | 2229 | 1829 | 0.15 | not applied | not applied | — | 20 | 8.6 | 7.7 |
| 2 | 3.5 | 1960 | 2250 | 1850 | 0.15 | not applied | not applied | — | 19 | 4.2 | 7.7 |
| 3 | 3.5 | 1960 | 2250 | 1850 | 0.23 | not applied | not applied | — | 20 | 4.1 | 9.6 |
| 4 | 3.5 | 1960 | 2250 | 1850 | 0.23 | applied | not applied | — | 20 | 2.5 | 9.6 |
| 5 | 3.5 | 1960 | 2250 | 1850 | 0.23 | applied | applied | 760 | 23 | 2.8 | 10.1 |
| 6 | 2.2 | 2113 | 2359 | 1959 | 0.23 | applied | applied | 805 | 16 | 2.2 | 15.5 |
| 7 | 3.5 | 1890 | 2250 | 1850 | 0.24 | applied | not applied | — | 38 | 3.1 | 7.5 |
| 8 | 3.5 | 1947 | 2250 | 1850 | 0.22 | applied | not applied | — | 17 | 2.5 | 7.8 |
| 9 | 3.5 | 1875 | 2250 | 1850 | 0.23 | applied | not applied | — | 25 | 3.0 | 10.0 |
| 10 | 3.5 | 2045 | 2250 | 1850 | 0.20 | applied | not applied | — | 5 | 7.9 | 8.3 |
| 11 | 3.5 | 1975 | 2250 | 1850 | 0.18 | applied | not applied | — | 45 | 1.7 | 13.5 |
| 12 | 3.5 | 1907 | 2250 | 1850 | 0.21 | applied | not applied | — | 52 | 1.9 | 11.0 |
| 13 | 3.5 | 1881 | 2250 | 1850 | 0.23 | not applied | not applied | — | 15 | 7.2 | 0.96 |
| 14 | 3.5 | 1915 | 2250 | 1850 | 0.21 | not applied | not applied | — | 6 | 6.8 | 2.1 |
| 15 | 3.5 | 1981 | 2250 | 1850 | 0.24 | not applied | not applied | — | 26 | 4.6 | 1.9 |
| 16 | 3.5 | 1895 | 2250 | 1850 | 0.22 | not applied | not applied | — | 33 | 7.8 | 2.3 |
| 17 | 3.5 | 1925 | 2250 | 1850 | 0.22 | not applied | not applied | — | 15 | 10.2 | 5.0 |

The following matters have been elucidated based on the results of the above experiments. First, although Example No. 1 satisfies the expression (1), the tensile strength TS of the hard-drawn wire of Example No. 1 is lower than the value in the right object of the expression (2) because the reduction of area of the wire at the time of drawing is low. Consequently, the spring of Example No. 1 has a deteriorated sag resistance compared to the springs of the other Examples Nos. 2 to 12. The fatigue life of the spring of Example No. 1 is as long as substantially equivalent to the springs of the other Examples Nos. 2 to 12.

Examples Nos. 2 to 9, 11, and 12 all satisfy the expressions (1) and (2), and satisfy the requirement regarding the number of precipitants each having a diameter of 50 μm or less. The springs of Examples Nos. 2 to 9, 11, and 12 show excellent fatigue life and sag resistance. Among these Examples, the spring of Example No. 2 differs from the spring of Example No. 3 in the aspect of shot-peening condition (namely, the shot used in the first time of shot-peening of the spring of Example No. 2 has a smaller size than that in the first time of shot-peening of the spring of Example No. 3) despite the fact that Example No. 3 used the same kind of steel material. As a result of this difference, the spring of Example No. 2 has a shorter distance to the crossing point than the spring of Example No. 3, and accordingly, the springs of Examples Nos. 2 and 3 have substantially the same level of sag resistance despite the fact that the fatigue life of the spring of Example No. 2 is shorter than that of Example No. 3.

The spring of Example No. 4 was obtained by applying a stress to the spring at 120° C. or higher, whereas the spring of Example No. 3 was obtained without applying a stress at 120° C. or higher although the spring of Example No. 3 was obtained without improved sag resistance, the fatigue life thereof is substantially the same as the spring of Example No. 3. The spring of Example No. 5 was obtained by applying a nitriding process, whereas the spring of Example No. 4 was obtained without applying a nitriding process. Although the springs of Examples Nos. 4 and 5 have substantially the same sag resistance, the spring of Example No. 5 has an improved fatigue life compared to the spring of Example No. 4. Example No. 6 is different from Example No. 5 in the degree of drawing and the diameter of wire, although the springs of Examples Nos. 5 and 6 are substantially the same in the composition of the steel material and the kinds of treatment. As a result of these differences, Example No. 6 has such a high tensile strength as 2113 MPa, as well as improved fatigue life. Example No. 7 uses a steel material having a relatively low carbon content, whereas Example No. 8 uses a steel material having a relatively high carbon content. The springs of both Examples Nos. 7 and 8 have excellent sag resistance and fatigue properties. Examples Nos. 11 and 12 have a relatively high content in chromium and vanadium, and have an increased number of precipitants having a diameter of 50 μm or less, as well as improved sag resistance and fatigue life.

Example No. 10 satisfies both the expressions (1) and (2). However, the cooling rate until the temperature of the wire rod reaches 400° C. after isothermal transformation at the time of patenting is fast and the amount of precipitants decreases with respect to Example No. 10. As a result, the number of precipitants having a diameter of 50 μm or less per unit area is less than ten with respect to Example No. 10. As a result, the spring of Example No. 10 has a slightly deteriorated sag resistance compared to the springs of Examples Nos. 2 through 9. However, the fatigue life of the spring of Example No. 10 is as long as the other Examples Nos. 1 to 9, 11, and 12.

Compared to the above Examples Nos. 1 to 12, Examples Nos. 13 through 17 are comparative examples. None of these comparative examples satisfy at least one of the requirements defined in this invention. As a result of the experiments, it was proved that Examples Nos. 13 through 17 have a deteriorated characteristic with respect to at least one of the properties found in Examples Nos. 1 through 12. The chemical composition of the steel material of Example No. 13 is substantially the same as Examples Nos. 1 through 6. However, since the wire rod of Example No. 13 was not subjected to cooling by gas at the time of patenting, proeutectoid ferrite was generated on the wire rod of Example No. 13, and the pearlite area ratio of the wire rod of Example No. 13 was lowered than the range defined in this invention. As a result, the fatigue life of the spring of Example No. 13 is remarkably lower than the spring of Example No. 7 although the wire of Example No. 13 has substantially same level of tensile strength TS as Example No. 7.

The wire rod of Example No. 14 is made of steel in conformance with the criteria of JIS G3502-SWRS92B.

However, the spring of Example No. 14 has deteriorated sag resistance and fatigue life compared to the springs of Examples Nos. 1 to 12. It is conceived that the reason for such a short fatigue life of the spring of Example No. 14 results from the fact that using the above steel having a higher carbon content resultantly raises defect sensitivity and leads to earlier formation of fatigue start point. Further, it is conceived that the reason for the lowered sag resistance of the spring of Example No. 14 is due to less content in silicon, chromium, vanadium, etc.

The steel material of Example No. 15 contains a large amount of silicon, and chromium and vanadium are also contained therein. However, since the steel material having high carbon content is used to produce the spring of Example No. 15, the fatigue life of the spring of Example No. 15 is short although sag resistance thereof is good.

The spring of Example No. 16 contains less amount of silicon compared to the spring of Example No. 115 (sic). Accordingly, the spring of Example No. 16 has deteriorated sag resistance compared to the spring of Example No. 15. The steel material of Example No. 17 has carbon content in the range defined in this invention. However, the steel material of Example No. 17 contains slightly less amount of silicon. Accordingly, although the fatigue property of the spring of Example No. 17 is slightly better than the springs of Examples Nos. 14 to 16, the spring of Example No. 17 does not have a fatigue property as high as the springs of the inventive examples, and sag resistance thereof is remarkably lowered compared to the springs of the inventive examples.

Industrial Applicability

This invention is constructed as mentioned above. According to this invention, realized are a steel wire rod used for producing hard-drawn springs capable of exhibiting fatigue strength and sag resistance equivalent to or higher than springs using an oil-tempered wire, a wire for such hard-drawn springs, such hard-drawn springs, and a useful method for producing such hard-drawn springs at a low cost.

What is claimed is:

1. A steel wire rod for hard-drawn springs which contains carbon in a range from 0.5 to less than 0.7 mass %, silicon in a range from 1.4 to 2.5 mass %, manganese in a range from 0.5 to 1.5 mass %, chromium in a range from 0.05 to 2.0 mass %, and vanadium in a range from 0.05 to 0.40 mass %, and has an area ratio Rp with respect to pearlite which satisfies the mathematical expression (1):

$$Rp(\text{area \%}) \geq 55 \times [C] + 61 \tag{1}$$

where [C] denotes the content (mass %) of carbon, and wherein ferrite in lamellar in which the number of carbide and carbonitride of vanadium and chromium, complex carbide and complex carbonitride of vanadium and chromium each having a diameter of 50 nm or less in terms of a hypothetical circle, is not smaller than ten per $\mu m^2$.

2. The steel wire rod according to claim 1, wherein the steel wire rod further contains nickel in a range from 0.05 to 0.5 mass %.

3. A wire for hard-drawn springs which contains carbon in a range from 0.5 to less than 0.7 mass %, silicon in a range from 1.4 to 2.5 mass %, manganese in a range from 0.5 to 1.5 mass %, chromium in a range from 0.05 to 2.0 mass %, and vanadium in a range from 0.05 to 0.40 mass %, and has an area ratio Rp with respect to pearlite which satisfies the mathematical expression (1), and has a tensile strength TS of the wire which satisfies the mathematical expression (2):

$$Rp(\text{area \%}) \geq 55 \times [C] + 61 \tag{1}$$

where [C] denotes the content (mass %) of carbon, $$-13.1d^3 + 160d^2 - 671d + 3200 \geq TS(\text{MPa}) \geq -13.1d^3 + 160d^2 - 671d + 2800 \tag{2}$$

where d is a diameter (mm) of the wire which satisfies the expression [$1.0 \leq d \leq 9.0$].

4. The wire according to claim 3, wherein the wire further contains nickel in a range from 0.05 to 0.5 mass %.

5. A hard-drawn spring producible by using the steel wire rod of claim 1.

6. A hard-drawn spring producible by using the wire of claim 3.

7. The hard-drawn spring according to claim 5, wherein a residual stress of the spring is changed from a compression to a tension at a depth of 0.05 mm or more from an inner surface of the spring.

8. The hard-drawn spring according to claim 6, wherein a residual stress of the spring is changed from a compression to a tension at a depth of 0.05 mm or more from an inner surface of the spring.

9. The hard-drawn spring according to claim 7, wherein the residual stress of the spring is changed from the compression to the tension at the depth of 0.15 mm or more from the inner surface of the spring.

10. The hard-drawn spring according to claim 8, wherein the residual stress of the spring is changed from the compression to the tension at the depth of 0.15 mm or more from the inner surface of the spring.

11. The hard-drawn spring according to claim 5, wherein the spring is applied with a nitriding process on a surface thereof.

12. The hard-drawn spring according to claim 6, wherein the spring is applied with a nitriding process on a surface thereof.

13. A method for producing the hard-drawn springs of claim 5 comprising the step of applying a stress $\tau$ (MPa) to the spring at a temperature not lower than a room temperature at least once after shot-peening, the stress $\tau$ satisfying the mathematical expression (3):

$$\tau \geq TS(\text{MPa}) \times 0.5 \tag{3}$$

where TS denotes a tensile strength of a wire.

14. The method according to claim 13, wherein the temperature at which the stress $\tau$ is applied is 120° C. or higher.

15. A method for producing the hard-drawn springs of claim 6 comprising the step of applying a stress $\tau$ (MPa) to the spring at a temperature not lower than a room temperature at least once after shot-peening, the stress $\tau$ satisfying the mathematical expression (3):

$$\tau \geq TS(\text{MPa}) \times 0.5 \tag{3}$$

where TS denotes a tensile strength of the wire.

16. The method according to claim 15, wherein the temperature at which the stress $\tau$ is applied is 120° C. or higher.

* * * * *